United States Patent [19]
Maekawa

[11] 3,837,320
[45] Sept. 24, 1974

[54] CASING FOR USE IN A ROTARY PISTON ENGINE

[75] Inventor: Kazuo Maekawa, Hiroshima, Japan

[73] Assignee: Toyo Kogyo Company Limited, Hiroshima, Japan

[22] Filed: Apr. 30, 1973

[21] Appl. No.: 355,377

[30] Foreign Application Priority Data
Apr. 29, 1972   Japan.............................. 47-43082

[52] U.S. Cl.............................. 123/8.01, 418/149
[51] Int. Cl............................................ F02b 53/00
[58] Field of Search.................... 418/149; 123/8.01

[56] References Cited
UNITED STATES PATENTS
1,894,353   1/1933   Kempton ............................ 418/149

Primary Examiner—C. J. Husar
Assistant Examiner—Michael Koczo, Jr.
Attorney, Agent, or Firm—Sughrue, Rothwell, Mion, Zinn & Macpeak

[57] ABSTRACT

A casing for use in a rotary piston engine provided with a water cooling jacket therein, said casing consisting essentially of a pair of side housings and a rotor housing assembled therebetween, with a sealing member fitted in a first groove which extends in an annular or a circular form along and in parallel with the trochoidal inner peripheral wall of said rotor housing, said first groove being provided in the mating surface of said rotor housing, said casing reaturing a second groove disposed in either or both of said rotor housing and side housing at the mating surface between said first groove and said trochoidal inner peripheral wall and approximately parallel to said trochoidal inner peripheral wall and having a branched passage in communication with the suction space or suction working chamber of said engine on its intake stroke. With this arrangement, the ingress of a hot gas through a gap, if any, between said mating surfaces may be prevented, thus protecting said sealing member from the thermal attack due to said hot gas.

10 Claims, 6 Drawing Figures

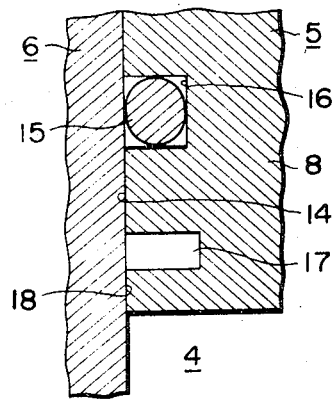
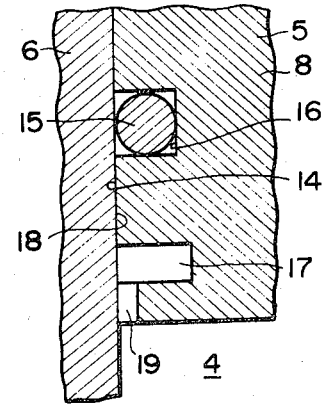
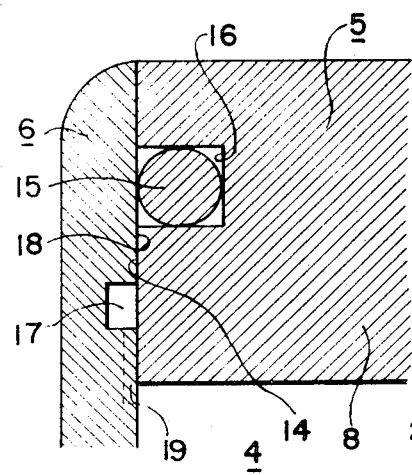
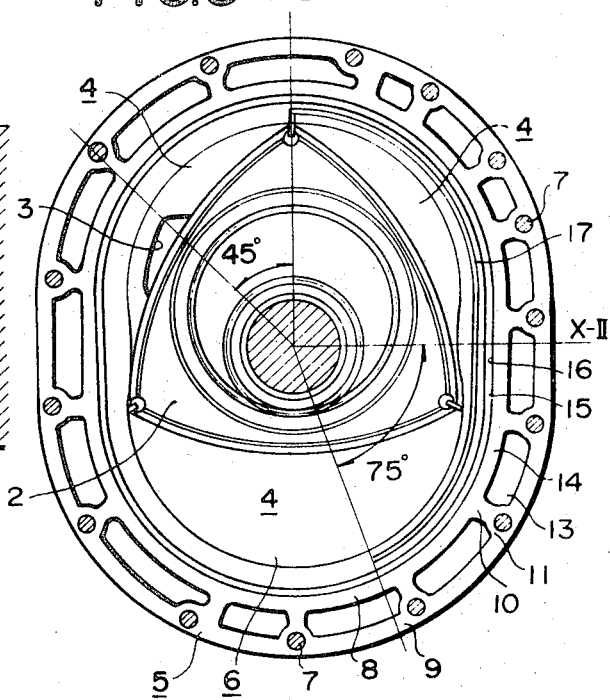

CASING FOR USE IN A ROTARY PISTON ENGINE

BACKGROUND OF THE INVENTION

This invention relates to a casing for use in a rotary piston engine and more particularly to a casing construction which is adapted to protect the sealing member incorporated between the rotor housing and side housing, from the thermal attack due to the ingress of a hot gas.

In general, a rotary piston engine consists of: a casing composed of a rotor housing having a cavity of a trochoidal shape in a lateral cross section thereof and a pair of side housings disposed on the opposite sides of said rotor housing; and a rotor of a polygonal shape adapted to effect a planetary motion within said cavity formed in said casing, whereby to perform, in sequence, the cycle of intake, compression, power and exhaust. With this arrangement, it is a common practice to provide for a rotary piston engine the corner seals, side seals, oil seals, etc., said corner seals being fitted in the side of the rotary piston for sealing against the side housings, while sealing allowance of the aforesaid sealings is maintained to a required value for providing positive gas-tightness between the rotary piston and side housings. This further entails an extremely high level of accuracy of dimensions, as well as a high level of water-tightness between the side housings and a rotor housing for a purpose of preventing leakage of the cooling water from the water passage into the working chamber.

Hitherto, with the engine of the type described, the side walls of the side housings are directly attached to those of the rotor housing with the rotor housing interposed therebetween and with O-rings provided in the interfaces between the two members, in a manner that said side housings are tightly fastened to said rotor housing by means of bolts for positive water-tightness.

However, the engine, having such a casing, has suffered from shortcomings that there tends to occur minute gap between the side housing and the rotor housing and then the hot gas under high pressure from the working chamber will make ingress through said gap to the aforesaid O-ring, thereby causing the deterioration thereof such that the cooling water in the cooling water passage will leak into the working chamber with the resultant critical discrepancies with the engine.

Meanwhile, it has been found that the gap of this kind is caused by the difference in the expansion coefficient of the different materials forming such side housing and rotor housing, when said members are subjected to high temperature, particularly through the interface of the two mating members in the vicinity of the groove in which is fitted the O-ring.

Accordingly, it is a principal object of the invention to provide the casing for use in a rotary piston engine, which can prevent or avert the ingress of a hot gas through said gap, if any, so as to protect the O-ring from the thermal attack due to such hot gas.

It is another object of the invention to provide a casing of the kind described which can inhibit the temperature rise in the interface of the side housing and rotor housing, particularly the portion of said interface in the vicinity of the sealing groove provided therebetween.

SUMMARY OF THE INVENTION

Briefly stated, according to the present invention, there is provided a casing for use in a rotary piston engine provided with a water cooling jacket therein, said casing consisting essentially of a pair of side housings and a rotor housing assembled therebetween, with a sealing member fitted in a first groove extending in an annular form along and in parallel with the trochoidal inner peripheral wall of said rotor housing, said first groove being provided in the mating surface of said rotor housing with said side housing, said casing being characterised by a second groove disposed in either or both of said side housing and said rotor housings at the mating surface between said first groove and said trochoidal inner peripheral wall and approximately parallel to said trochoidal inner peripheral wall and having a branched passage in communication with the suction space or suction working chamber of said engine on its intake stroke. With this arrangement, the ingress of a hot gas through a gap created between said mating surfaces of said rotor housing and side housings may be prevented or averted into the suction space or, if required to the atmosphere, thereby protecting said sealing member from the thermal attack due to said hot gas.

BRIEF DESCRIPTION OF THE DRAWINGS

FIG. 3 is an enlarged cross sectional view taken along the line III—III of FIG. 1;

FIG. 4 is an enlarged cross sectional view taken along the IV—IV of FIG. 1;

FIG. 5 is an enlarged view similar to that of FIG. 4 which gives another modification of the second groove; and FIG. 6 is a vertical cross sectional view of a rotary piston engine provided with the casing according to the present invention, showing the hot and suction zones with respect to the periphery of the trochoid.

PREFERRED EMBODIMENTS OF THE INVENTION

Figure 2:
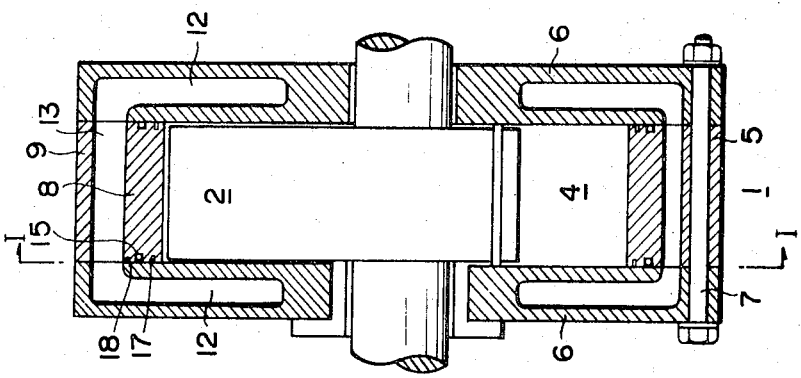
FIG. 2 is a cross sectional view of the engine of FIG. 1.
Figure 1:
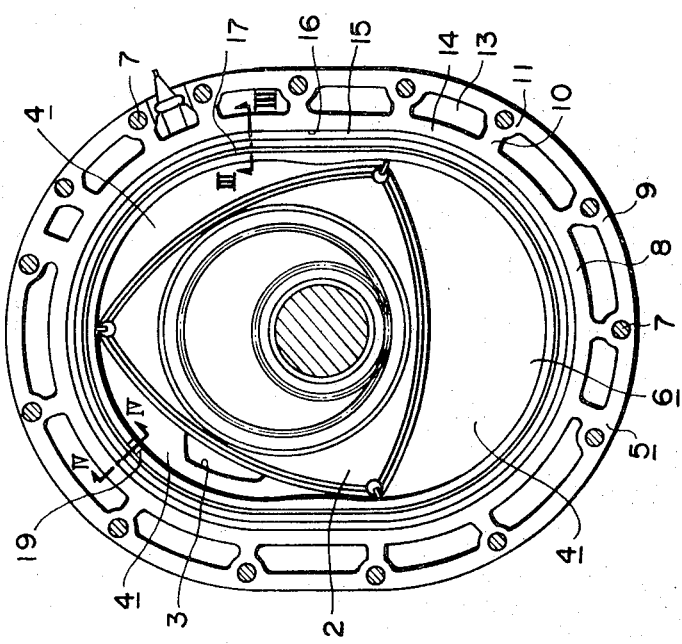
FIG. 1 is a vertical cross-sectional view of a rotary piston engine provided with the casing according to the present invention, taken along line 1—1 of FIG. 2.

Referring now to FIGS. 1 and 2, there is shown cross sectional views of a rotary piston engine, in which a casing 1 houses rotary piston 2 which is journaled on an eccentric shaft and adapted to effect a planetary movement. The rotation of the rotary piston 2 sucks the working fluid from a suction opening 3 into a working chamber 4, followed by compression, power and exhaust.

The casing 1 is composed of a rotor housing 5 having a cavity of a trochoidal inner peripheral wall, and side housings 6 located on the opposite sides of the former. The rotor housing and side housings are fastened together with a plurality of bolts 7 extending in an axial direction. The rotor housing 5 is formed with an inner wall 8 and an outer wall 9, with walls 8 and 9 being spaced a distance from each other, and rigid with rib portions 10 or bolt boss portions 11. A passage 13 for cooling water is provided in the rotor housing 5 in a manner to communicate with a cooling water passage 12. Provided in the side wall of the inner wall 8, i.e., the side mating surface 14 of the rotor housing are an annular groove or a first groove 16, in which is fitted a sealing member 15 such as an O-ring and a second groove of an annular form 17 which extends inwardly of said first groove. The groove 17 thus arranged serves to block ahead of the groove 16 the ingress of hot combustion gas under high pressure through a minute gap between the mating surface 14 and the corresponding mating surface 18 of the side housings 6. More particularly, the hot gas thus introduced in said groove 17 is then led through a passage 19 into a lower temperature and lower pressure region, i.e., the suction side working chamber, as shown. On the other hand, it may be of consequence to prevent air pollution by introducing the combustion gas existent in the groove 17 into the suction working chamber. However, the introduction of the hot gas into the suction working chamber is only one of measures taken from the viewpoints of preventing the deterioration of the sealing member by reducing the pressure in the groove 17 or the measure to prevent the distortion of the materials by decreasing the temperature at the mating surfaces in the vicinity of the grooves 16 and 17. In other words, there may be provided a passage corresponding to the passage 19 in the rib 10 and bolt boss 11 to thereby discharge the hot gas to atmosphere with the accompanied reduction in pressure in and temperature at or in the vicinity of the groove 17. The cross sectional shape of the groove 17 may be either 'V' or 'U', while the location thereof may be in either or both of the corresponding mating surfaces of the side housing 6 and rotor housing 5. These arrangements are well illustrated in FIGS. 3 through 5, in which FIG. 5 shows the groove 17 and the passage 19 provided in the mating surface of the side housing 6.

Furthermore, the type of the groove 17 may be of an annular or circular arc form covering part of the circumference of the trochoidal inner peripheral wall of the rotor housing 5. Anyhow, what is even more important is the fact that the hot combustion gas permeating through a minute gap between the mating surface of the rotor housing and that of the side housing is introduced into the second groove 17, through the passage 19 and into the low-temperature, low-pressure space, i.e., the suction working chamber or the atmosphere, whereby the thermal attack to the sealing member 15 due to the hot combustion gas may be prevented or minimized, with the accompanied advantage of reducing the temperature at the interface between the mating surfaces, particularly in the vicinity of the groove 16, with the result of minimized distortion or warping of the rotor housing and side housings.

Referring to FIG. 6, there are shown so-called suction zone extending from the major axis X–I of the trochoid to the line turned through an angle of 45° therefrom in a counterclockwise direction, while the hot zone extends from the major axis X–I to the line turned through an angle of 75° from the minor axis X–II in a clockwise direction. This hot zone covers the steps of compression, combustion, and exhaust. Accordingly, the passage 19 should at least be introduced into the suction zone, while the groove 17 should at least cover the hot zone with respect of the periphery of the trochoid.

As is apparent from the foregoing description, there is provided a second groove at the mating surface between the first groove and said trochoidal inner peripheral wall and in parallel with the first groove i.e., the groove in which is fitted a sealing member such as O-ring, and the second groove is in communication with the suction working chamber, whereby the ingress of the hot combustion gas through a gap between said mating surfaces of the rotor housing and side housings may be prevented or minimized by averting or introducing said gas into said suction working chamber, while the temperature rise in the vicinity of the first groove is also minimized thereby. Accordingly, the deterioration of the sealing member due to the thermal attack of the hot gas as well as the leakage of the cooling water into the working chamber may be prevented, thereby presenting extended service life for the engine. The minimized temperature rise in the vicinity of the sealing member results in the accompanied prevention of the abnormal wear at the interface of the mating surfaces, which wear is caused by the increased bearing pressure acting on said mating surfaces. More particularly, the differences in shape and material between the side housing and the rotor housing, when heated will cause the relative sliding therebetween due to the difference in the thermal deformation rate. Accordingly, the greater the bearing pressure, the greater the sliding which will be caused against the excessive frictional force caused by said bearing pressure, such that the abnormal wear is further accelerated thereby. The minimized temperature rise in the vicinity of the sealing member at the interface of the rotor housing and side housing will minimize the abnormal wear, accordingly.

While the present invention has been described with reference to particular embodiments thereof, it will be understood that numerous modifications and alterations can be made by those skilled in the art without actually departing from the scope of the invention or the appended claims.

What is claimed is:

1. In a rotary piston internal combustion engine having:
   a rotor housing having a trochoidal inner peripheral wall therein;
   a pair of side housings disposed at the opposite sides of said rotor housing;
   a rotary piston adapted to rotate in a planetary fashion and journaled on an eccentric shaft, while being housed in said rotor housing to thereby form a plurality of working chambers with said inner peripheral wall of said rotor housing and inner side wall of said side housings, each of said working chambers being variable in volume during the planetary motion of said rotary piston to thereby perform four strokes of intake, compression, power and exhaust;
   a cooling jacket provided in said rotor housing and side housings for cooling said engine by using cooling water circulating therethrough;
   sealing means adapted to prevent the leakage of said cooling water from said jacket into said working chambers, said sealing means being fitted in a first groove extending along and in parallel with said trochoidal inner peripheral wall and provided on at least one of the mating surfaces of the rotor housing and said side housing;
   the improvements comprising:
   a second groove provided on at least one of said rotor housing and said side housing at the mating surface between said first groove and said trochoidal inner peripheral wall and approximately parallel to said trochoidal inner peripheral wall; and a passage means adapted to communicate said second groove with the working chamber on the intake stroke.

2. A rotary piston internal combustion engine as set forth in claim 1, wherein said second groove extends at least partly over the circumference of said trochoidal inner peripheral wall of said rotor housing.

3. A rotary piston internal combustion engine as set forth in claim 1, wherein said second groove means extends over the entire circumference of said trochoidal inner peripheral wall.

4. A rotary piston internal combustion engine as set forth in claim 1, wherein said second groove means is positioned in the area of the power stroke of the working chamber.

5. A rotary piston internal combustion engine as set forth in claim 4, wherein said area covers from a spark plug to an outlet port.

6. A rotary piston internal combustion engine as set forth in claim 2, wherein said second groove extends at least over the range covering from the major axis on the suction side, of the trochoid to the line turned through an angle of 75° from the minor axis of said trochoid in a rotating direction of said rotary piston.

7. A rotary piston internal combustion engine as set forth in claim 1, wherein said passage means is provided in at least one of the mating surfaces of said rotor housing and said side housing.

8. A rotary piston internal combustion engine as set forth claim 7, wherein said passage means is provided within the range covering from the major axis on the suction side, of the trochoid to the line turned through an angle of 45° in a counter-rotational direction of said rotary piston.

9. A rotary piston internal combustion engine as set forth in claim 1, wherein said groove is provided in each of said mating surfaces of said rotor housing.

10. A rotary piston internal combustion engine as set forth in claim 1, wherein said second groove means is provided in each of mating surfaces of said side housings.

* * * * *

UNITED STATES PATENT OFFICE
CERTIFICATE OF CORRECTION

PATENT NO. : 3,837,320

DATED : October 24, 1974

INVENTOR(S) : Kazuo Maekawa

It is certified that error appears in the above-identified patent and that said Letters Patent are hereby corrected as shown below:

Column 6, line 15, in claim 9, after "said" and before "groove", insert
----second----

Signed and sealed this 15th day of April 1975.

(SEAL)
Attest:

RUTH C. MASON
Attesting Officer

C. MARSHALL DANN
Commissioner of Patents
and Trademarks